US008662284B2

(12) United States Patent
Suttie

(10) Patent No.: US 8,662,284 B2
(45) Date of Patent: Mar. 4, 2014

(54) ITEM TRANSPORTATION

(75) Inventor: Robert Suttie, Fife (GB)

(73) Assignee: NCR Corporation, Duluth, GA (US)

( * ) Notice: Subject to any disclaimer, the term of this patent is extended or adjusted under 35 U.S.C. 154(b) by 140 days.

(21) Appl. No.: 13/330,251

(22) Filed: Dec. 19, 2011

(65) Prior Publication Data

US 2013/0153372 A1 Jun. 20, 2013

(51) Int. Cl.
*B65G 15/14* (2006.01)

(52) U.S. Cl.
USPC ...................... 198/626.1; 414/791.2; 271/189

(58) Field of Classification Search
USPC .......... 198/626.1, 626.2, 626.3, 626.4, 626.5, 198/626.6; 414/788.9, 790, 790.8, 791.5, 414/793.4, 794; 271/3.02, 127, 236, 238, 271/161, 162, 188, 189, 218, 292
See application file for complete search history.

(56) References Cited

U.S. PATENT DOCUMENTS

| | | | | |
|---|---|---|---|---|
| 4,607,995 | A * | 8/1986 | Hodges | 414/790.3 |
| 6,076,826 | A * | 6/2000 | Gerlier et al. | 198/626.1 |
| 6,092,948 | A * | 7/2000 | Altfather | 400/625 |
| 6,238,114 | B1 * | 5/2001 | Bennett et al. | 271/218 |
| 6,283,470 | B1 * | 9/2001 | Hirai | 271/189 |
| 6,341,934 | B1 * | 1/2002 | Takeno et al. | 414/791.2 |
| 6,471,204 | B1 * | 10/2002 | Tamaki | 271/176 |
| 7,726,645 | B2 * | 6/2010 | Gerlier et al. | 271/122 |
| 8,262,085 | B2 * | 9/2012 | Feygelman | 271/209 |

* cited by examiner

*Primary Examiner* — James R Bidwell
(74) *Attorney, Agent, or Firm* — Michael Chan

(57) ABSTRACT

A method and apparatus are disclosed for locating at least one item of media at a desired location. The apparatus includes a first and further transport element for transporting an item of media along a transport path having a pre-determined plane of transport. The apparatus also includes at least one abutment surface that locates respective first and second lateral edge regions of the item or a central region of the item to a side of the plane of transport to provide an arcuate cross-section in at least a region of the item.

19 Claims, 9 Drawing Sheets

ITEM TRANSPORTATION

FIELD OF THE INVENTION

The present invention relates to a method and apparatus for locating at least one item of media at a desired location. In particular, but not exclusively, the present invention relates to the generation of an arcuate cross-section in sheet-like item of media which is to be moved from one position to another. Imbuing the item with an arcuate cross-section stiffens the item which can thereafter be transported more effectively.

BACKGROUND TO THE INVENTION

Media depositories are used to receive media items from a customer. One common type of media depository is a sheet media depository for receiving items of media in sheet form. For example, such items of media can be currency notes, checks, tickets, giros, receipts or the like.

Sheet media depositories are used in automated teller machines (ATMs) and other self-service terminals. Other such self-service terminals are vending machines, change machines, teller units, cash recyclers or the like. The sheet media depositories are used to identify, validate and store or return deposited sheets.

Some sheet depositories are capable of receiving a bunch of sheets in a loading area and then picking individual sheets from the bunch so that each sheet can then be identified and validated individually prior to storage of the validated sheet within a depository or returned to a customer. These depositories are sometimes referred to as bunch sheet depositories. Bunch sheet depositories may transport the bunch from a loading area to a picking area or the picking area may be adjacent to the loading area.

Bunches of items of media such as currency notes and/or checks are thus deposited by a user and, subsequent to a user agreement step and item verification step, these items are stored semi-permanently within a self-service terminal until security staff or bank staff come to empty the storage unit. The storage unit is sometimes referred to as a stacking bin. Alternatively, when an input item is identified as being an illicit or damaged item, the item is stored in a storage unit referred to as a reject bin.

In prior known ATMs, teller assist units, and other self-service terminals or the like which may or may not include a depository, items such as checks or currency notes are thus driven through a sheet transport system using pairs of rollers and/or belts that pinch the items and rotate to drive items along a pre-determined pathway. Often, at a final pair of rollers, the items are pushed into a stack of items being stored or dispensed. Because of the flexible nature of the items, it is difficult to ensure that transported items of media reach a desired destination.

Another problem which is well observed in prior art systems relates to the quality of the item of media which is to be transported. For example, for a new item such as a currency note, the finish of the sheet of paper which provides the item body has a reasonable degree of rigidity. However, over time this rigidity is lost as multiple users manipulate the item. Thus, an old item such as an old currency note can be highly flexible and lack stiffness. This makes the movement and location of such a note at a desired position difficult to achieve. In practice, the note must be supported over almost an entire transport pathway or a risk exists that the note will deviate from a desired transport path and become lost or tangled.

SUMMARY OF THE INVENTION

It is an aim of the present invention to at least partly mitigate the above-mentioned problems.

It is an aim of certain embodiments of the present invention to provide a method and apparatus for locating at least one item of media at a desired location which stiffens the item of media as it is transported relative to its natural state.

It is an aim of certain embodiments of the present invention to provide a method and apparatus which cups an item of media so that at least a part of the item of media is bent into an arcuate cross-section as an item of media is transported.

It is an aim of certain embodiments of the present invention to generate a curved cross-section in an item of media to provide sufficient rigidity in the item so that it may be held and driven at a first end thereof whilst a leading free end may be urged into a desired location.

According to a first aspect of the present invention there is provided apparatus for locating at least one item of media at a desired location, comprising:

- a first and further transport element for transporting an item of media along a transport path having a pre-determined plane of transport; and
- at least one abutment surface that locates respective first and second lateral edge regions of said an item or a central region of said an item to a side of the plane of transport to provide an arcuate cross-section in a region of the item.

Aptly, the first and second lateral edge regions are located in a first direction with respect to the plane of transport and the central region is located in the plane of transport, or the central region is located in a first direction with respect to the plane of transport and the first and second lateral edge regions are located in the plane of transport, or the first and second lateral edge regions are located in a first direction with respect to the plane of transport and the central region is located in an opposite second direction with respect to the plane of transport.

Aptly, said at least one abutment surface comprises a first and second abutment surface, each abutment surface comprising a region of a contact surface of a respective profile forming member.

Aptly, each profile forming member comprises a roller arranged to rotate about a respective longitudinal axis and being rotatably mounted at a position adjacent to a respective one of the first and second lateral edge regions.

Aptly, each roller has a truncated cone-shaped outer surface which comprises said contact surface, a larger diameter end of the outer surface being located distal to a centre line of the transport path.

Aptly, the first and further transport elements comprise a pair of opposed belt members, each arranged along a respective belt pathway in which the belt members are arranged in a co-operating juxtaposed relationship to transport an item of media therebetween.

Aptly, the first and further transport elements comprise a pair of opposed rollers arranged to rotate to transport an item of media by constantly pinching the item at a moving pinch region and propelling the item as the rollers rotate co-operatively.

Aptly, at least one guide member, each comprising an abutment guide surface, is arranged to engage with a lateral edge region of said an item subsequent to said lateral edge region being located to a side of the plane of transport.

Aptly, each guide member is pivotably mounted at a first end region thereof, a free end of each guide member being arranged to lift in a direction away from the direction of transport when engaged by a lateral edge region of said item.

Aptly, each guide member is mounted so that as a trailing edge of said an item leaves said first and further transport element, the guide member drops in a direction towards the plane of transport to thereby locate said an item in a stacking position.

Aptly, each guide member moves independently.

According to a second aspect of the present invention, there is provided an automated teller machine (ATM) or self-service unit which includes apparatus for locating at least one item of media at a desired location, comprising:

a first and further transport element for transporting an item of media along a transport path having a pre-determined plane of transport; and at least one abutment surface that locates respective first and second lateral edge regions of said an item or a central region of said an item to a side of the plane of transport to provide an arcuate cross-section in a region of the item.

According to a third aspect of the present invention, there is provided a method for locating at least one item of media at a desired location, comprising the steps of:

transporting an item of media along a transport path having a pre-determined plane of transport; and as the item is transported, locating first and second lateral edge regions of said an item or a central region of said an item to a side of the plane of transport to provide an arcuate cross-section in a region of said item.

Aptly, the method includes the steps of:

driving a pair of opposed rollers or belt members to thereby transport the central region of said an item along the transport path in said plane of transport; and locating first and second lateral edge regions of the item to a side of the plane of transport by urging the lateral edge regions out of the plane of transport with respective abutment surfaces.

According to a fourth aspect of the present invention, there is provided a method of locating an item of media at a desired location, comprising the steps of:

stiffening the item of media by generating an arcuate cross-section in the item; and transporting the stiffened item to the desired location.

According to a fifth aspect of the present invention, there is provided a method of locating items of media in a stacking position, comprising:

one-by-one stiffening each of a plurality of items of media by generating an arcuate cross-section in the whole or part of the item;

via a first and further drive element, driving each item consecutively, in a stiffened state, towards a stacking position;

retarding each item of media with at least one guide member as it approaches the stacking position; and via the at least one guide member, locating each retarded item in the stacking position as a trailing edge of the item leaves the first and further drive element to thereby provide a stack of items of media at the stacking position.

Certain embodiments of the present invention provide the advantage that a versatile transport system is provided that allows consistent stacking/transportation of a wide range of media thickness and/or qualities.

Certain embodiments of the present invention provide the advantage that the integral properties of an item of media are used to best advantage during transportation of an item.

Certain embodiments of the present invention provide the advantage that the transportation and/or stacking of items of media is achieved with a purely mechanical system without the need for additional solenoids and/or sensors and/or motors. The system can thus be achieved in a very cost-effective way.

Certain embodiments of the present invention provide the advantage that new currency notes or well used currency notes may be transported and/or stacked using a similar transport path. Currency notes are located at a desired location regardless of any inherent rigidity.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
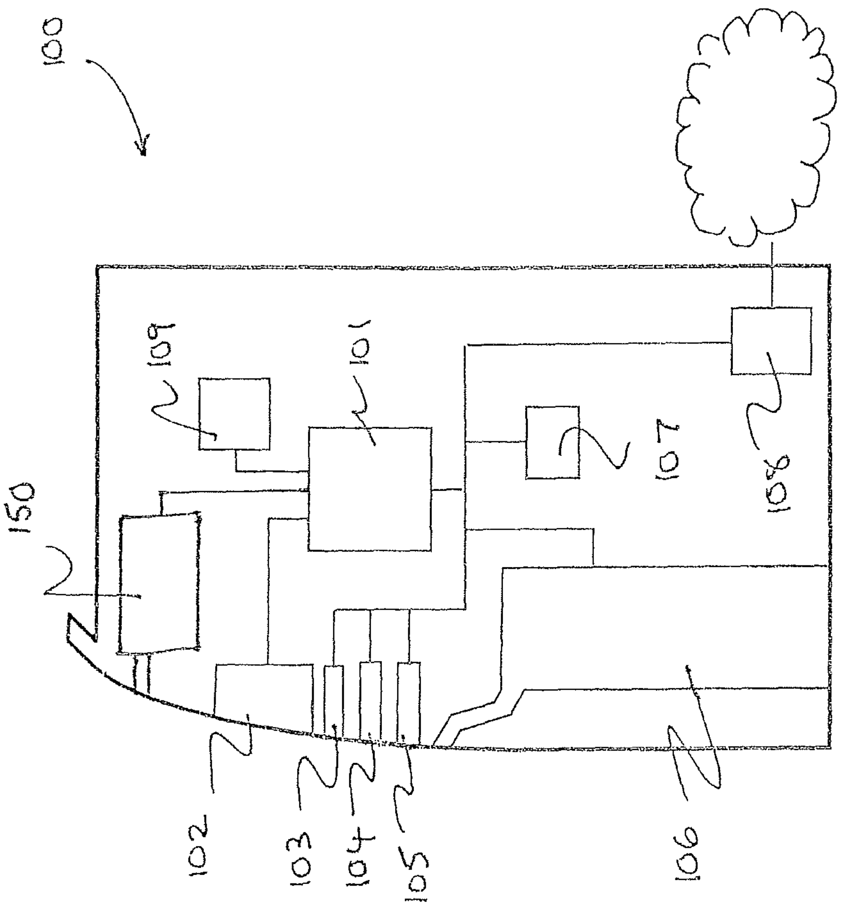
FIG. 1 is a schematic diagram of an ATM according to an embodiment of the present invention.

In the drawings like reference numerals refer to like parts.

FIG. 1 illustrates a block diagram of a self-service terminal 100 in the form of an automated teller machine (ATM) according to one embodiment of the present invention. It will be understood that certain embodiments of the present invention are applicable to other types of terminal such as ATMs, cash recyclers, teller assist units, vending machines, self-service terminals, change machines and the like.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser module 106, a journal printer module 107 for creating a record of every transaction executed by the ATM, a connection module 108, an operator panel module 109 for use by a service operator (such as a field engineer, a replenisher (of currency, of printed paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers.

FIG. 1 also illustrates a schematic diagram of a deposit module 150 according to one embodiment of the present invention. The deposit module 150 is operable to receive bunches of items of media such as currency notes, bank notes and/or checks from a customer. These can be stored securely or returned to a customer.

Figure 2:
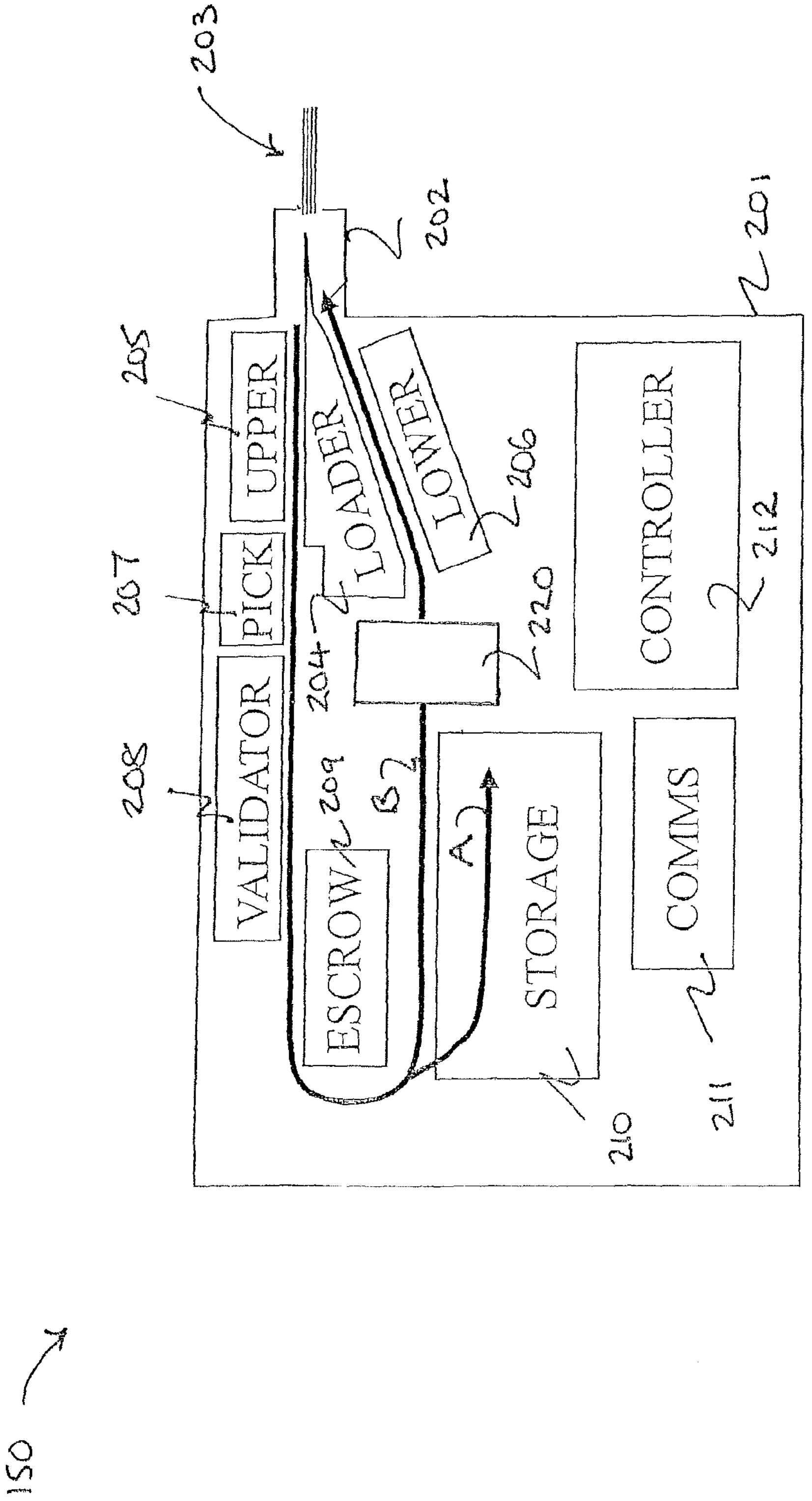
FIG. 2 is a schematic diagram of a dispensing module according to an embodiment of the present invention.

The dispenser module 106 is shown in more detail in FIG. 2 and illustrates how items of media such as currency notes or the like may be loaded into cassettes, stored in pick module regions and thereafter picked one-by-one for subsequent provision at a stacker point. In more detail, the dispenser module 106 shown in FIG. 2 includes two pick modules 200, 201. These are cavities within a surrounding chassis into which a cassette containing many stacked currency notes may be located. The pick module 201 shown in FIG. 2 is illustrated with a currency cassette 202 fitted therein. It will be appreciated that certain embodiments of the present invention are not restricted to the use of dispensing modules having two pick modules. Rather, one, two, three, four or more pick modules may be provided within a dispenser module.

Each pick module is associated with a respective pick transport 203, 204, whereby items of media picked from a cassette in a particular pick module are thereafter fed into an adjacent pick transport. Thereafter, items of media are transported one-by-one into a presenter transport region 210. Within the pick module and presenter transport items of media are subject to sensing techniques which detect media length and singularity. If an item of media is regarded as being acceptable, that is to say, sensor signals are within predetermined threshold limits, the item continues through the presenter transport 210 until it is stacked at a stacker area 211. If the media is regarded as being unacceptable, transport of the item will continue only a part way through a transport pathway but is diverted and thereafter stored in a divert transport region and a further item of media will be picked and stacked to replace the diverted one.

Figure 3:
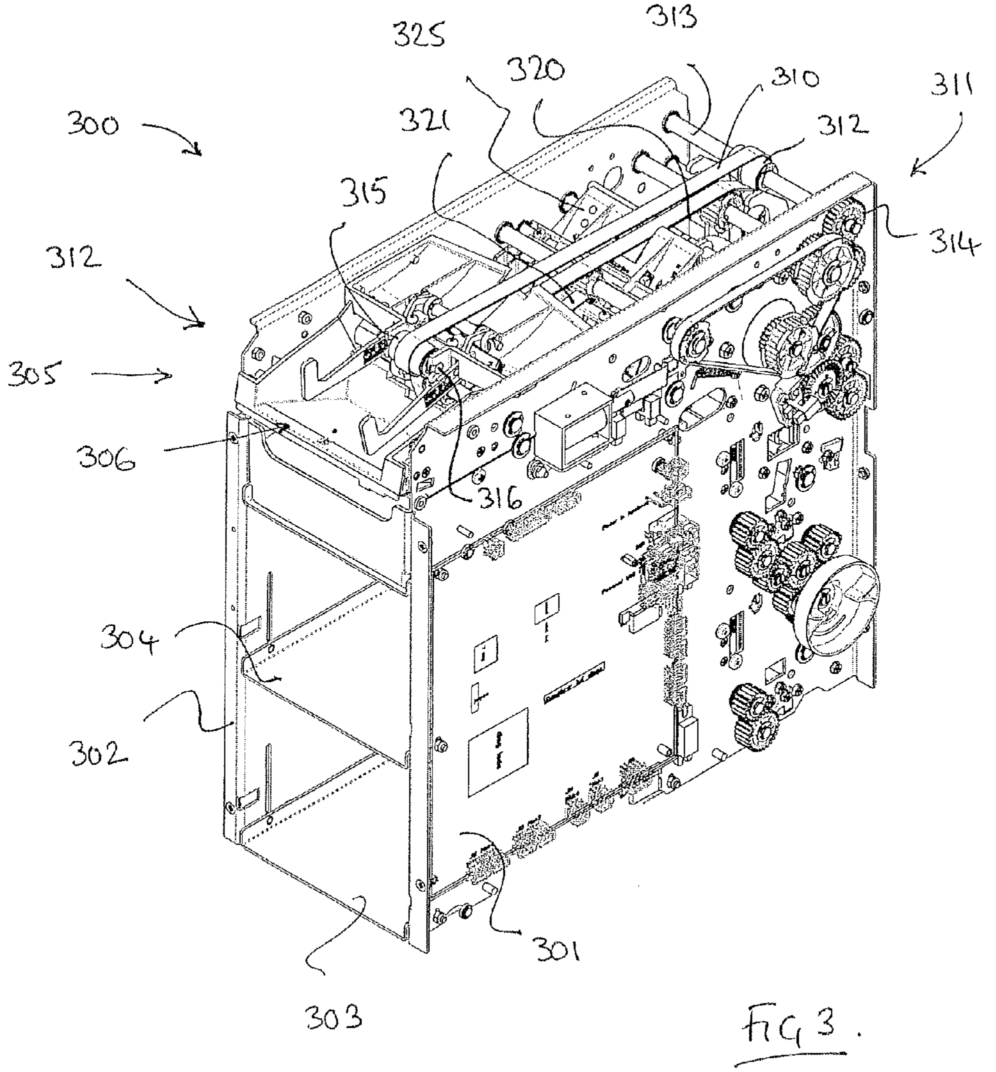
FIG. 3 illustrates another view of a currency note dispensing module in the ATM.

FIG. 3 illustrates another view of the currency note dispensing module 106 of an ATM. It will be appreciated that certain embodiments of the present invention are not restricted to use of a dispensing module or indeed use in an ATM. Rather, certain embodiments of the present invention are broadly applicable to circumstances where an item of media such as a flexible sheet-like item of media such as a voucher or currency note or receipt or the like is to be transported from one location to another.

The dispensing module 106 shown in FIG. 3 has a first side wall 301 which is spaced apart from and substantially parallel with a further side wall 302. The space between the side walls provides a cavity for two currency cassettes (not shown) which are each located on a respective shelf. A first shelf 303 forms a base of the module 300 whilst a further shelf 304 extends between the front and back walls about half way up. The shelves bridge the gap between the side walls. As illustrated in FIG. 3, there are multiple belts and associated spur gears which are driven and interlinked to transfer items of media from the currency cassettes generally upwards in the module to the upper region 305 which provides a transport pathway region leading to an exit orifice 306 where items of media are dispensed. It will be understood that a gear is a rotating machine part having teeth or cogs which mesh with other co-operating parts. Two gears or more working together provide a transmission. It will be appreciated that certain embodiments of the present invention can provide drive through other mechanisms. A belt is a loop of flexible material which provides a connection between rotating parts. For example, between rotating shafts or between a rotating shaft and a wheel or pulley. Belts are used as a source of motion to transmit power.

As illustrated in FIG. 3, a main drive belt 310 extends from a back region 311 of the dispensing module towards a front region 312. One end of the major belt 310 is linked over a drive drum 312 which is driven by a respective drive shaft 313 which is itself driven by rotation of a drive gear 314. Thus, as the drive gear 314 is rotated, the shaft 313 rotates causing the drum 312 mounted thereon to rotate. The rotation of the outer abutment surface of the drum 312 causes the drive belt 310 to be driven. Another end of the belt 310 is provided by a further drum 315 which is mounted towards the front 312 of the dispensing module. The drum 315 has a shaft 316 which extends there through longitudinally and ends of the shaft are each supported in a respective slot of a drum support 317.

The major drive belt 310 is opposed with and co-operates with a first co-operating drive belt 320 and a further co-operating drive belt 321. These are illustrated more clearly in FIGS. 7 and 8.

In use, items of media such as currency notes or the like are located one-by-one onto a transport path with an ultimate desired destination being the exit orifice 306. The items of media are held between opposed parts of the belt and as these belts rotate, items of media are moved along the transport path therebetween. As illustrated in FIG. 3, a purge plate 325 can be pivoted about a respective pivot point 326 to flip up and direct items of media being carried between the major belt 310 and the first co-operating belt 320 into a purge bin 330. With the purge plate in a non-operational state, items of media are carried in a substantially linear pathway towards the exit orifice. Items are purged if they are defective or if more than one item is detected or if a user cancels a transaction.

Figure 4:
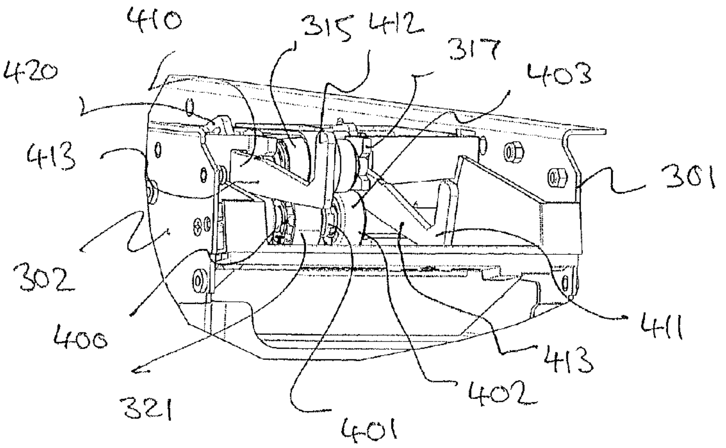
FIG. 4 illustrates a magnified view of a dispensing orifice.

FIG. 4 illustrates parts of the dispensing module in the region of the exit orifice in more detail. As illustrated in FIG. 4, the drum 315 which supports an end of the major belt 310 is substantially convex in shape. That is to say, the drum is like a crowned roller. The drum thus has a diameter which extends from a first end towards a central region and then reduces from that central region towards a further end. A shaft 316 which extends from each end of the drum can be seen in FIG. 4 located in the slot of the support 317.

As illustrated in FIG. 4, the major drive belt 310 loops over the central region of the drum 315. Likewise, the further co-operating belt 321 is driven on a supporting gear 400 which rotates with a drive shaft 401. The drive shaft 401 also carries a pair of rollers 402. Each roller 402 has a truncated cone shape which presents an outer running surface 403 which is diametrically smaller towards a central region where the co-operating belt 321 is located than at an outer end towards the first wall 301 or opposed wall of the dispensing module.

FIG. 4 also helps illustrate the location of a first guide arm 410 and a further guide arm 411. Each guide arm 410, 411 has a first dog leg end which is substantially L-shaped. Thus, an upwardly extending leg 412 extends substantially perpendicular to a longitudinal arm 413. A further end of each guide arm includes a hook 420 which hooks over a guide shaft to enable the guide arms to rotate. In FIG. 4 the left hand side guide arm 413 shown closest to the left hand side wall is in an upper position whilst the right hand side guide arm 413 closest to the first side wall 301 is shown in a lower state. In use, the guide arms are used to guide items of media as they are borne along the transport path and emerge at a region between the co-operating belts. As the items emerge, they are curved from a substantially planar state in which they are transported between the belts into an arcuate cross-section which then enables the items of media to be driven out of the dispensing unit towards a storage zone at the exit orifice.

Figure 5:
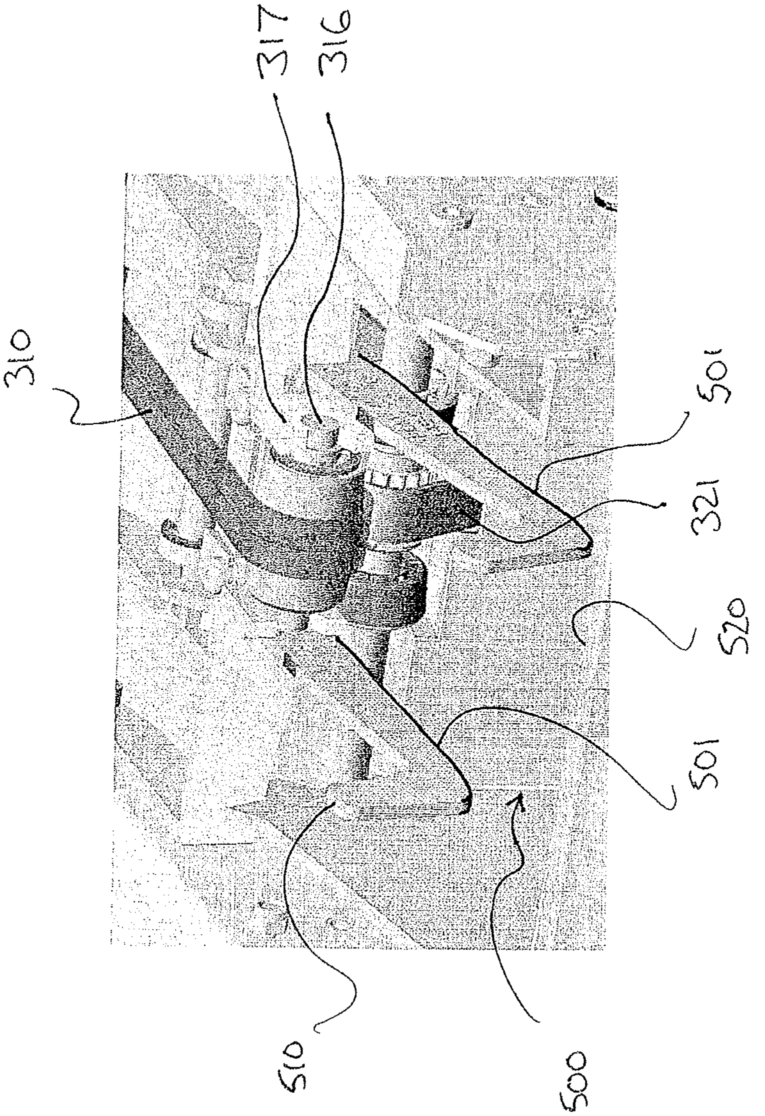
FIG. 5 illustrates another view of the parts shown in FIG. 4.

FIG. 5 helps illustrate the storage zone 500 in more detail and also helps illustrate how the upper major belt 310 co-operates with the further co-operating belt 321. As will be understood, the items of media thus emerge at a position between the belts. The items of media such as currency notes have a longitudinal length and also a cross-section in their body which defines a plane of transport. The items are thus transferred in a common plane of transport and emerge between the belts. Because the rotating rollers are located slightly offset with respect to the plane of transport, the items of media are curved as they pass between the rollers. A leading edge of an item of media will thus begin to curve as it emerges and this will continue. Because of the curved state this imbues rigidity into the currency note which then enables it to be thrust outwards into the exit zone 500 where items of media are stacked one-by-one. The position of the guides is mechanically timed so that as a leading edge of an item of media emerges, a lower abutment surface 501 of each guide will engage with side regions of an item of media. As the item of media is thus thrust rigidly out between the co-operating belts, the item lifts the guide arms. This helps break movement of the items and helps control the items. As the item of media continues to be thrust along the transport path, the guide arms are lifted higher and higher. As previously mentioned, the guide arm to the left hand side of FIG. 5 is shown in an upper position which is representative of a position of a guide arm when almost a whole item of media has been thrust out between the belts. At this moment in time, further upward motion of the guide arm is prevented because an upper tip 510 of the guide arm will abut with a ceiling wall (not shown) on the dispensing unit. The guide arm shown towards the right hand side of FIG. 5 is illustrated in a downward position characteristic of the position of the guide arm before an item of media emerges or just as the item of media begins to abut with the lower abutment surface 501 of the side arm and begin a lifting process. In practice, both arms will tend to move in common so that the arms appear at around the same height moving upwards or downwards.

As a trailing edge of the item of media is ejected between the co-operating belts, there is no longer any rigid structure lifting the guide arms. At this point the guide arms will both simultaneously drop which helps locate the items of media onto a support surface 520 where items of media can accumulate in a stack. Leading edges of the stacked items of media are presented at the exit orifice 306 for picking by a user.

Figure 6:
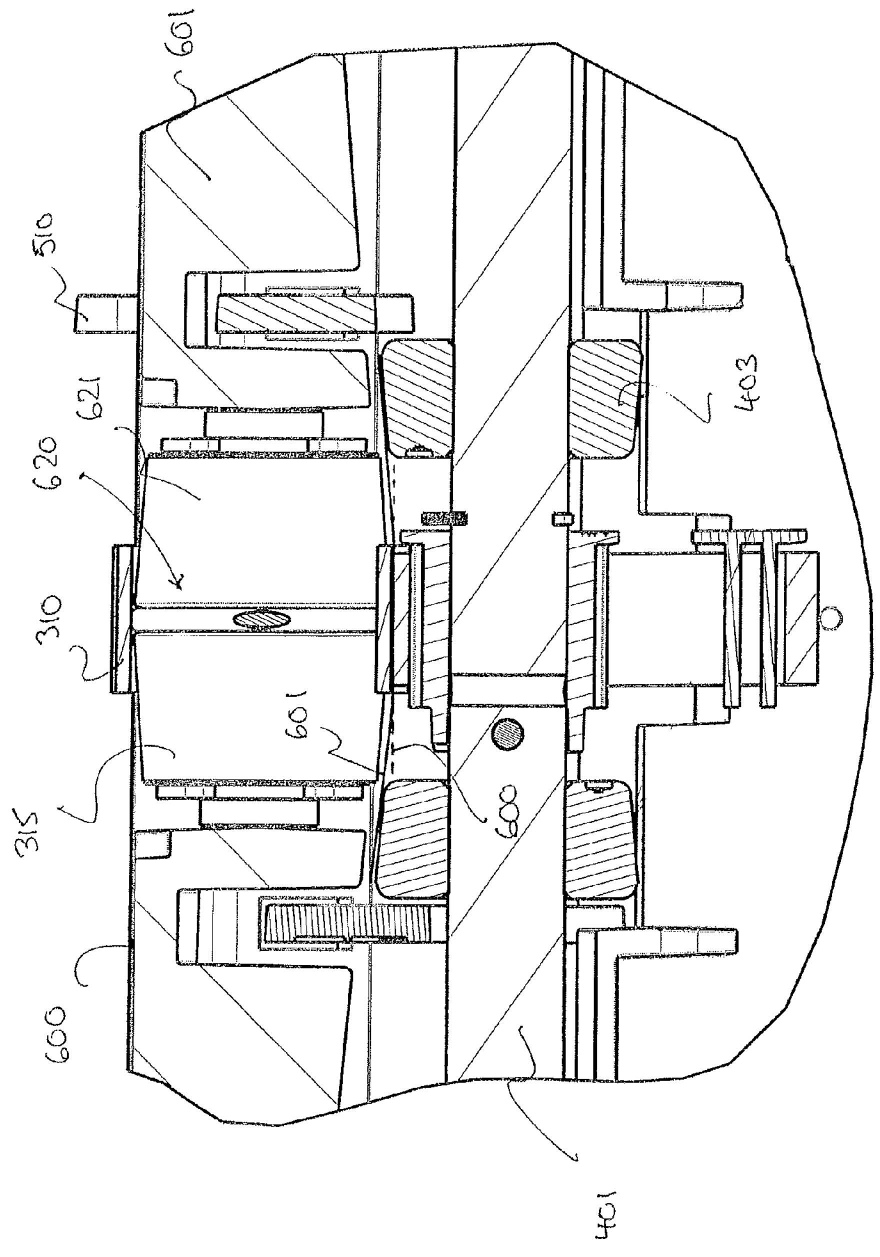
FIG. 6 illustrates an item of media being bent out of a pre-determined plane of transport.

FIG. 6 illustrates the positioning of the roller 315 which supports the drive belt 310 in more detail. FIG. 6 also helps illustrate how the shaft 401 carries two rollers 403 which deform an item of currency from a substantially planar plane of transport shown by dashed line 600 into a curved state. FIG. 6 illustrates an item of media such as a currency note or the like 601 in which an arcuate cross-section has been imbued. It will be appreciated that by imbuing an arcuate cross-section into a sheet-like item of media, the rigidity of the item is increased. By increasing the rigidity in this way, transportation of the item of media is made easier.

As illustrated in FIG. 6, each roller 403 has a truncated cone-like outer surface which has a greater diameter at ends towards the side walls of the dispensing module. The outer abutment surface of the rollers extends above the plane of transport in which an item of media is ejected between the opposing rollers. In this way, the leading edge of the item of media abuts with the outer surface of the rollers and is deformed upwardly.

It will be appreciated that FIG. 6 illustrates a view of the rollers 403 looking towards the exit orifice. Thus, a back portion of the guides is shown with the tip 510 of the left hand side guide shown in FIG. 5 just visible and extending above an upper surface 600 of a crossbar 601. As the item of media is thus urged into the page shown in FIG. 6 towards the exit orifice, a curved cross-section is imparted. It will be appreciated that whilst certain embodiments of the present invention have been described in which the edge regions of an item of media are lifted above a plane of transport, certain other embodiments of the present invention could provide a downturned curve in the item of media. The two rollers 403 thus act as profile forming members and the outer surface of the rollers which is a truncated cone-type shape act as an abutment surface.

FIG. 6 also helps illustrate how the flat belt 310 rides on a central region 620 of the rotating drum 315. The outer drive surface 621 of the drum 315 has a groove formed in it in which an "O" ring is located. This is illustrated more clearly in FIGS. 9 to 11. By having a flat belt 310 ride on a crowned surface, the belt is continually centred so that the belt does not slide off the drive surface. Also, by having a high friction ring in a groove in the outer surface the crowned profile of the drum is enhanced and also slippage between the flat belt and the drive drum is entirely avoided or at least substantially mitigated.

Figure 7:
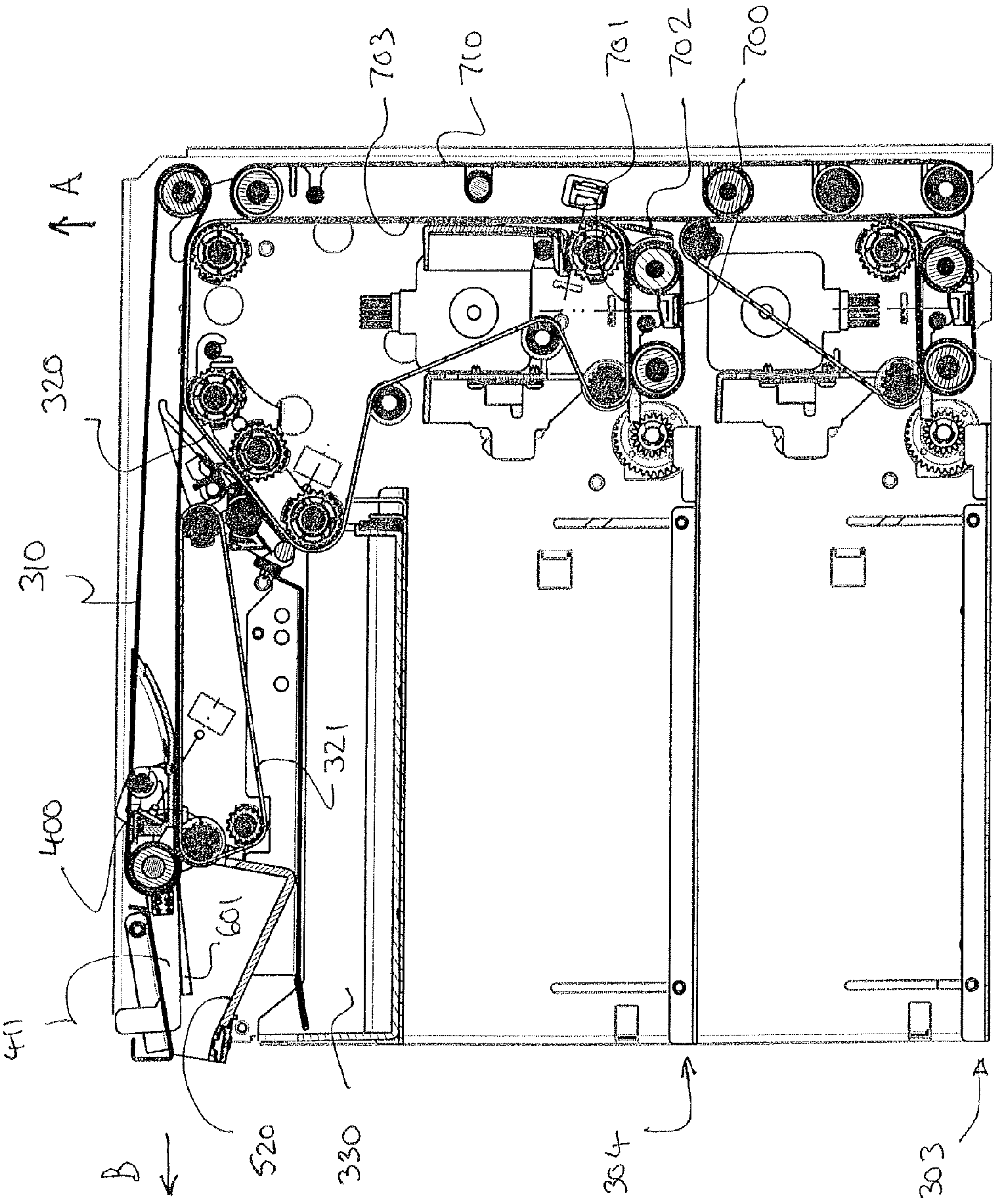
FIG. 7 illustrates a side view of the dispensing module with guide bars in an upper position.

FIG. 7 is a side view of the module shown in FIG. 3 and illustrates how the empty compartments formed above the base plate shelf 303 and mid-floor shelf 304 provide spaces into which currency cassettes may be located. As will be understood by those skilled in the art, as a currency cassette is slotted into a respective cavity, parts interlock with the various belts and gears of the module so that items of media can be removed from the currency cassette one-by-one and carried along a pre-determined transport pathway between opposed co-operating belts. For example, if a currency cassette (not shown) were located on the mid-floor 304 an item of media could be extracted and would be moved from left to right between a lower rotating belt 700 and a portion 701 of the first co-operating belt 320. An item of media would thus be moved from left to right until it reached a guide 702 which curves the item upwardly where it is transported between a further region 703 of the first co-operating belt 320 and a third co-operating belt 710. An item of media thus moves vertically upwardly in the direction shown by arrow A in FIG. 7 and then is turned around a corner and begins to move towards the left hand side shown in FIG. 7 along a transport direction shown by Arrow B. FIG. 7 illustrates how an emerging item of media 601 causes a guide arm 411 and a further spaced apart guide arm (not shown) to lift.

Figure 8:
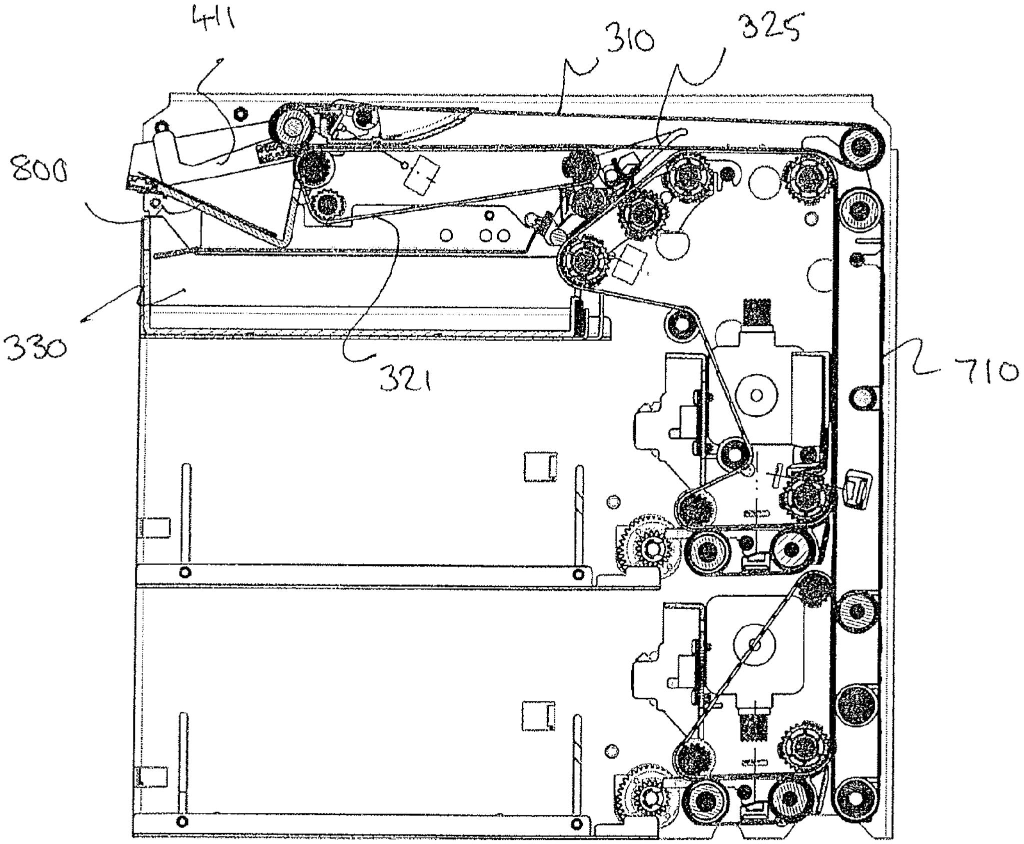
FIG. 8 illustrates a side view of the dispensing module shown in FIG. 7 but with guide bars in a lower position.

FIG. 8 illustrates a similar view to that shown in FIG. 7 except in FIG. 8 the guide arms 411 have dropped downwardly because an item of media 601 has been fully discharged from between the major belt 310 and the further co-operating belt 321. The item of media which is imbued with rigidity by being curved in cross-section no longer thus urges or lifts a guide arm upwards. The guide arm thus eventually because of its mass and gravity falls downwards which helps break the ejection of the item of media and locates the item of media 601 in an accumulating stack 800. Thus, each guide arm is mounted so that as a trailing edge of an item of media leaves the first and further transport elements provided by the major belt 310 and further co-operating belt 321, the guide arms drop in a direction towards the plane of transport and locate an item of media in a stacking position. Thus, a method is provided in which currency notes can be located at a desired location such as a stacking position in which the items of media are transported along a transport path which has a pre-determined plane of transport and then, as the item is transported, lateral edges of the currency note or a central region of the currency note are located to one side of the plane of transport. This provides an arcuate cross-section in a region such as a leading region or the whole region or a rear region of the item which increases rigidity and allows the item to be duly directed into a desired position.

Figure 9:
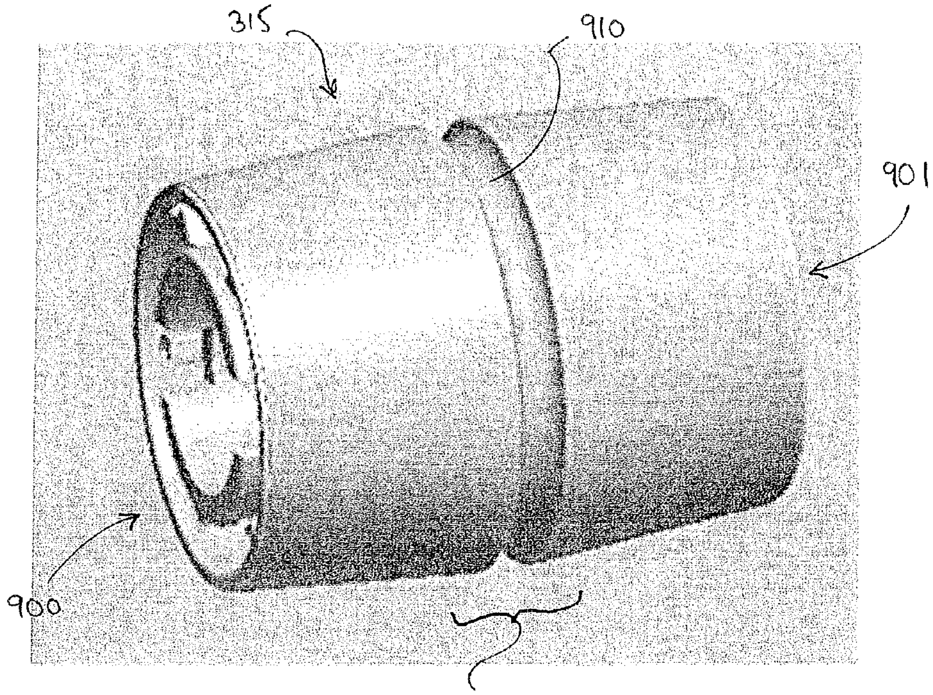
FIG. 9 illustrates a drum member with a groove extending circumferentially there around.

FIG. 9 helps illustrate the drive drum 315 in more detail. It will be appreciated that all of the drums or one or more or a plurality of the drums in the dispensing module may have a similar cross-section as the drum 315 shown in FIG. 9. The drum 315 is a rigid elongate structure having a longitudinal axis and being generally circular in cross-section, much like a cylinder. A first end 900 and a further end 901 have a similar diameter. This diameter increases as one moves from the ends of the drum towards a central region 902. In cross-section, the drum thus has a crowned roller appearance. It will be appreciated that a shaft (not shown) can be thrust along the length of the drum and thus the drum rotated by rotating the shaft. A groove 910 extends circumferentially around the whole of the circumference of the drum at a central region. The groove 910 shown in FIG. 9 has a U-shaped profile. However, it will be understood that grooves having different shaped profiles such as V-shapes or rectangular shapes could be utilized.

Figure 10:
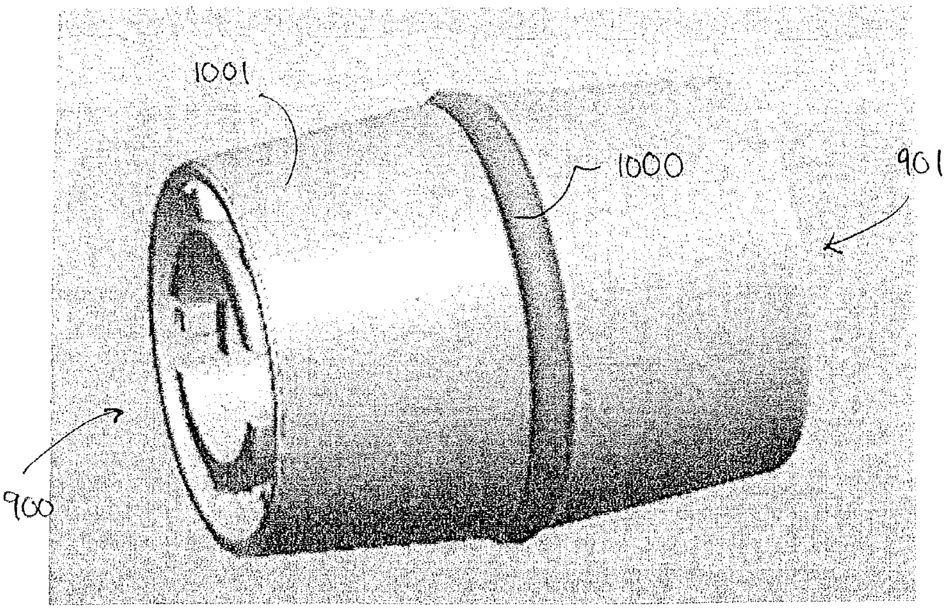
FIG. 10 illustrates the drum member shown in FIG. 9 with a high friction ring in the groove.

FIG. 10 illustrates the drum shown in FIG. 9 in which an "O" ring 1000 has been duly located in the groove 910. Rings having different shaped cross-sections could of course be utilized to match a groove shape. Because of the elastomeric nature of the "O" ring this can be stretched over an end of the drum and then run up across the abutment surface and located in the groove. Whilst the drum thus has an outer surface 1001 which is substantially hard and smooth and thus does not present a high friction surface to a belt riding thereon, the "O" ring is manufactured from a material having a high co-efficient of friction. The outer surface of the drum could of course be roughened or coated to make it provide a high friction surface. Alternatively, the drum may be manufactured from a high friction material. The drum member is thus rotatable about a longitudinal axis of rotation and includes an outer support surface that generally increases in diameter from a first end region to a central region and then decreases in diameter from the central region to a further end region. The central region includes a groove in the support surface which extends circumferentially around the drum member. A ring member is located in the groove. Aptly, the ring member is manufactured from a material that has a co-efficient of friction of at least about around 0.70. Aptly, the co-efficient of friction of the ring member is at least about around 0.90. Aptly, the co-efficient of friction of the ring member is at least about around 1.00. Aptly, the ring member is a rubber "O" ring. Because the ring member is arranged in the groove but extends beyond the outer surface of the drum, a flat belt running along the central crowned region of the drum does not slip and is impelled by the high friction ring. Flat belts can thus be used in the dispensing module without the need for expensive V belts or toothed belts to be utilized as is known in the art.

Figure 11:
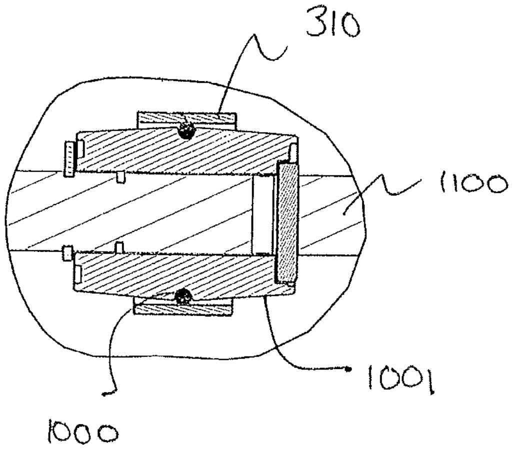
FIG. 11 illustrates how a flat belt rides on a high profile central region of the drum member.

FIG. 11 helps illustrate how the flat belt 310 rides along on a central region of the drum shown in FIG. 10 when the drum is mounted on a shaft 1100. For example, the drum may be the drum 315 shown in FIG. 3 or the drum 312 shown in FIG. 3. The shaft 1100 may be the drive shaft 313 shown in FIG. 3 or may be the shafts 316 which extend from the drum 315 and are supported in slots in a drum support on either side thereof.

A method of preventing slippage between a rotatable drum member and a flat belt member are thus provided. This is achieved by providing a groove in an outer surface of a rotatable drum member and providing a ring in the groove whereby as the drum rotates the ring provides a non-slip surface between a flat belt that at least partially rides on the outer surface of the drum and the ring member and between the ring member and the drum member.

Because the cross-sectional profile of each drum is convex, a method of centring a flat belt member on a rotating drum is also provided. This is because the crowned surface will cause a belt 310 to constantly centre around the central region of the drum. Thus, even if an operator attending the dispensing machine accidentally knocks a belt and causes the belt to be widely off centred on a drum when the machinery is turned on the flat belt will quickly ride upwards from an end of a drum towards the central region and thereafter function accordingly. Providing a ring member which extends proud of the outer surface of the rotatable drum helps maximize the centring process and also helps provide a non-slip surface. Thus, centring and provision of a non-slip interface can be provided simultaneously and automatically.

Certain embodiments of the present invention thus include the fitment of shaped rollers fitted offset to a centre line in order to encourage a media into a V-shaped or U-shaped profile as the leading edge of the item of media passes through a shaping zone. This action stiffens the media along its profile allowing the item of media to be repeatedly transported within the transport. This action of lifting the media with shaped rollers in turn pushes the media guides upwards. The guides are constrained by a stop which is positioned to ensure that the guides are aligned to a position where the media must run along the base of the guides which then act as a media brake. As the rear of the note passes beyond the shaped rollers the guides gently move downwards assisting the media to move into a stack position which is in a nearby tray.

There are no additional motors, solenoids or censors required to put certain embodiments of the present invention into effect. The system is mechanical and as such is a low cost method of providing a system of transporting and stacking items of media with a wide range of stiffness characteristics.

Consistent transportation of items of media having a wide range of media qualities is thus provided.

A crown roller may be utilized with an internally grooved profile into which a high friction band, for example, a low cost "O" ring, is applied. This high friction band reduces the slippage between the crown roller and a flat belt. Additionally, a high profile point is provided in the roller to assist in the centring of the belt on a crown drum such as a crown pulley. An advantage is the ability of the belt to self-centre even if displaced during an action such as an operator jam clearance. This helps improve consistency of media transportation and reduces reject rate due to more consistent transport performance. The drum can be driven to provide drive to a belt or a belt can be driven to provide drive to a shaft on which a drum is mounted.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/ or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for locating at least one item of media at a desired location, comprising:

first and second transport elements for transporting an item of media along a transport path having a pre-determined plane of transport; and at least one abutment surface that locates respective first and second lateral edge regions of the item or a central region of the item to a side of the plane of transport to provide an arcuate cross-section in a region of the item;

the first and second lateral edge regions are located in a first direction with respect to the plane of transport and the central region is located in the plane of transport, or the central region is located in a first direction with respect to the plane of transport and the first and second lateral edge regions are located in the plane of transport, or the first and second lateral edge regions are located in a first direction with respect to the plane of transport and the central region is located in an opposite second direction with respect to the plane of transport.

2. The apparatus as claimed in claim 1, further comprising:

the at least one abutment surface comprises a first and second abutment surface, each abutment surface comprising a region of a contact surface of a respective profile forming member.

3. The apparatus as claimed in claim 1, wherein the first and second transport elements comprise a pair of opposed belt members, each arranged along a respective belt pathway in which the belt members are arranged in a co-operating juxtaposed relationship to transport an item of media therebetween.

4. The apparatus as claimed in claim 1, wherein the first and second transport elements comprise a pair of opposed rollers arranged to rotate to transport an item of media by constantly pinching the item at a moving pinch region and propelling the item as the rollers rotate co-operatively.

5. The apparatus as claimed in claim 1, further comprising:

at least one guide member, each comprising an abutment guide surface, arranged to engage with a lateral edge region of the item subsequent to the lateral edge region being located to a side of the plane of transport.

6. The apparatus as claimed in claim 5, further comprising:

each guide member is pivotably mounted at a first end region thereof, a free end of each guide member being arranged to lift in a direction away from the direction of transport when engaged by a lateral edge region of the item.

7. The apparatus as claimed in claim 5, wherein each guide member is mounted so that as a trailing edge of the item leaves the first and second transport elements, the guide member drops in a direction towards the plane of transport to thereby locate the item in a stacking position.

8. The apparatus as claimed in claim 5, wherein each guide member moves independently relative to each other.

9. An automated teller machine (ATM) or self-service unit comprising the apparatus as claimed in claim 1, wherein the item of media is a currency note and the desired location comprises a dispensing port.

10. Apparatus for locating at least one item of media at a desired location, comprising:

first and second transport elements for transporting an item of media along a transport path having a pre-determined plane of transport; and at least one abutment surface that locates respective first and second lateral edge regions of the item or a central region of the item to a side of the plane of transport to provide an arcuate cross-section in a region of the item;

the at least one abutment surface comprises a first and second abutment surface, each abutment surface comprising a region of a contact surface of a respective profile forming member;

each profile forming member comprises a roller arranged to rotate about a respective longitudinal axis and being rotatably mounted at a position adjacent to a respective one of the first and second lateral edge regions.

11. The apparatus as claimed in claim 10, wherein each roller has a truncated cone-shaped outer surface which comprises the contact surface, a larger diameter end of the outer surface being located distal to a centre line of the transport path.

12. A method for locating at least one item of media at a desired location, the method comprising the steps of:

transporting an item of media along a transport path having a pre-determined plane of transport; and as the item is transported, locating first and second lateral edge regions of the item or a central region of the item to a side of the plane of transport to provide an arcuate cross-section in a region of the item, wherein the first and second lateral edge regions are located in a first direction with respect to the plane of transport and the central region is located in the plane of transport, or the central region is located in a first direction with respect to the plane of transport and the first and second lateral edge regions are located in the plane of transport, or the first and second lateral edge regions are located in a first direction with respect to the plane of transport and the central region is located in an opposite second direction with respect to the plane of transport.

13. The method as claimed in claim 12, further comprising:

driving a pair of opposed rollers or belt members to thereby transport the central region of the item along the transport path in the plane of transport; and locating first and second lateral edge regions of the item to a side of the plane of transport by urging the lateral edge regions out of the plane of transport with respective abutment surfaces.

14. A method of locating an item of media at a desired location, the method comprising the steps of:

stiffening the item of media by generating an arcuate cross-section in the item as the item is being transported along a transport path which is defined between first and second transport elements;

moving a leading edge of the stiffened item into engagement with at least one guide member to lift up the at least one guide member after the leading edge of the stiffened item emerges from the transport path as the stiffened item is being transported along the transport path;

continuing to lift up the at least one guide member as the item continues to be transported along the transport path until a trailing edge of the item emerges from the transport path; and dropping the at least one guide member onto the item to move the item to the desired location when the trailing edge of the item emerges from the transport path.

15. The method as claimed in claim 14, wherein dropping the at least one guide member onto the item includes using force of gravity to act on the mass of the at least one guide member to move the item to the desired location when the trailing edge of the item emerges from the transport path.

16. The method as claimed in claim 14, wherein continuing to lift up the at least one guide member includes lifting the at least one guide member higher and higher as the item continues to be transported along the transport path.

17. The method as claimed in claim 14, wherein dropping the at least one guide member onto the item includes simultaneously dropping a plurality of guide members on the item to move the item to the desired location when the trailing edge of the item emerges from the transport path.

18. The method as claimed in claim 17, wherein simultaneously dropping a plurality of guide members on the item includes using force of gravity to act on the mass of the plurality of guide members to move the item to the desired location when the trailing edge of the item emerges from the transport path.

19. The method as claimed in claim 18, wherein continuing to lift up the at least one guide member includes lifting the plurality of guide members higher and higher as the item continues to be transported along the transport path.

* * * * *